(12) United States Patent
Beck

(10) Patent No.: US 9,270,141 B2
(45) Date of Patent: Feb. 23, 2016

(54) PHOTOVOLTAIC SYSTEM WITH SELECTIVE MPP MISMATCH

(75) Inventor: Bernhard Beck, Dimbach (DE)

(73) Assignee: Adensis GmbH, Dresden (DE)

( * ) Notice: Subject to any disclaimer, the term of this patent is extended or adjusted under 35 U.S.C. 154(b) by 110 days.

(21) Appl. No.: 13/089,916

(22) Filed: Apr. 19, 2011

(65) Prior Publication Data

US 2011/0276188 A1 Nov. 10, 2011

(30) Foreign Application Priority Data

May 4, 2010 (DE) .......................... 10 2010 019 267

(51) Int. Cl.
*G06F 1/30* (2006.01)
*H02J 7/35* (2006.01)
*H02J 3/00* (2006.01)
*H02J 3/38* (2006.01)
*H02J 9/00* (2006.01)
*H02J 9/06* (2006.01)

(52) U.S. Cl.
CPC .. *H02J 7/35* (2013.01); *H02J 3/383* (2013.01); *H02J 3/385* (2013.01); *H02J 9/00* (2013.01); *H02J 9/06* (2013.01); *H02J 2003/001* (2013.01); *Y02E 10/563* (2013.01); *Y02E 10/566* (2013.01); *Y02E 10/58* (2013.01)

(58) Field of Classification Search
USPC ........................................................ 700/297
See application file for complete search history.

(56) References Cited

U.S. PATENT DOCUMENTS

| 4,779,050 | A | * | 10/1988 | Ohnari ........................... 324/426 |
|---|---|---|---|---|
| 6,362,540 | B1 | * | 3/2002 | Hill .................................. 307/52 |
| 6,590,793 | B1 | * | 7/2003 | Nagao et al. ..................... 363/95 |
| 7,072,194 | B2 | | 7/2006 | Nayar et al. |
| 7,193,872 | B2 | * | 3/2007 | Siri .................................. 363/95 |
| 2005/0002214 | A1 | * | 1/2005 | Deng et al. ..................... 363/131 |
| 2008/0094867 | A1 | * | 4/2008 | Muller et al. ............... 363/56.05 |
| 2008/0143188 | A1 | * | 6/2008 | Adest et al. ...................... 307/82 |
| 2009/0020151 | A1 | * | 1/2009 | Fornage ........................ 136/248 |
| 2009/0236917 | A1 | * | 9/2009 | Bettenwort et al. ............. 307/82 |
| 2010/0001587 | A1 | * | 1/2010 | Casey et al. ..................... 307/80 |
| 2010/0320842 | A1 | | 12/2010 | Beck |

FOREIGN PATENT DOCUMENTS

| DE | 40 32 569 A1 | 4/1992 |
|---|---|---|
| DE | 20 2004 021 675 U1 | 6/2010 |
| DE | 10 2009 025363 A1 | 2/2011 |
| EP | 1 623 495 B1 | 10/2009 |
| EP | 2 426 570 A1 | 3/2012 |

* cited by examiner

*Primary Examiner* — Sean Shechtman
(74) *Attorney, Agent, or Firm* — Muncy, Geissler, Olds & Lowe, P.C.

(57) ABSTRACT

A method for operating a photovoltaic system provides, with the turning off of the otherwise adjusted regulation to the maximum power point MPP, to make a selective mismatching at the inverter, in order to cause a battery current, which is added to the system current. As a result, an additional energy source to maintain a minimum feed power is achieved during a rapidly changing cloud pattern.

16 Claims, 4 Drawing Sheets t=t₀
P=1,2 P min t=t₁
P=1,05 P min t=t₂
P=1,01 P min t>t₂
P= P$_{PV}$ + P$_{Batt}$ > P$_{min}$

PHOTOVOLTAIC SYSTEM WITH SELECTIVE MPP MISMATCH

This nonprovisional application claims priority under 35 U.S.C. §119(a) to German Patent Application No. 10 2010 019 267.8, which was filed in Germany on May 4, 2010, and which is herein incorporated by reference.

BACKGROUND OF THE INVENTION

1. Field of the Invention

The invention relates to a method and a device for operating a photovoltaic system having an inverter at whose input terminals the DC output voltage of the photovoltaic system is applied and whose output can be connected to a supply network, and having a battery bank connected in parallel to the input terminals, whereby the inverter is provided with a regulating element for adjusting the maximum power point (MPP) of the photovoltaic system.

2. Description of the Background Art

During the construction of solar power plants, it is provided sometimes in the supply agreements with the associated electric utility to supply a contractually guaranteed minimum power within an established time interval to the supply network. Thus, for example, it can be required for a 2.4 MW (Mega Watt) solar power plant that a power of at least 60%, therefore about 1.5 MW, is to be supplied between 11:00 a.m. and 5:00p.m. Depending on weather conditions, the minimum power often cannot be generated by the solar plant alone, and replacement power plants on a DC (Direct Current) basis, such as, for example, a battery or a fuel cell, must be connected in addition. In a prolonged predicted energy reduction, an additional power plant must then be called upon on the AC (Alternating Current) side. This occurs either by the additional purchasing of the amount of energy from another energy supplier or by connection of an additional power plant on the AC side, e.g., in the form of a diesel generator or a gas power plant. The possible energy suppliers have different startup times until their power can be fed in. This ranges from virtually immediately during the discharge of a battery up to about 5 minutes for the starting of a supplementary power plant.

FIG. 1 shows a plant in which a photovoltaic generator (PV generator) 1 is connected in a typical manner to the input terminals 3, 3' of an inverter 5 to whose output a supply network 7 is connected. A second inverter 5', whose DC voltage side leads to a battery or battery bank 9, is tied into supply network 7. If the power produced by the PV generator is not sufficient, the battery is discharged via the second inverter 5' into the network and in this way supports the low-performing PV system 1. The discharged battery 9 is then charged by means of the line voltage. A disadvantage in this arrangement, on the one hand, is that two inverters 5, 5' are required, which increases investment costs. On the other hand, electrical losses occur in the second inverter 5' during its charging from the supply network 7 and these are also associated with costs. As a result, two inverters 5 and 5' are used to recharge the battery with direct current generated in the PV system.

SUMMARY OF THE INVENTION

It is therefore an object of the present invention to modify the aforementioned method and the aforementioned device at low technical cost in such a way that an operationally favorable and quickly available maintenance of an established minimum power is made possible without the use of a second inverter or other cost-intensive components.

This object is achieved in that the photovoltaic system with the turning off of the otherwise adjusted regulation is operated selectively mismatched at the maximum power point (MPP) in that a selective mismatch is made at the inverter. As a result, a battery current is to be generated, which is added to the plant current. This in turn leads to an additional energy source for maintaining a minimum supply power during a rapidly changing cloud pattern. This means that a discharge current from the battery bank to the input terminals of the inverter is provoked if a predefinable minimum power of the photovoltaic system is not achieved. The advantage of the mismatch is that the voltage value established via the MPP regulating element (MPP controller) is set to a lower voltage value than would belong to the current maximum power point calculated for the prevailing conditions.

Depending on the extent of the voltage difference between the available battery voltage and the adjusted PV voltage, a desired additional current will flow in the inverter and be delivered to the supply network converted as alternating current. This will be explained further below with respect to FIG. 4. Based on the lower voltage value, the battery bank connected parallel to the PV system is discharged and the discharge current on the part of the battery is added to the current generated by the PV system. The power loss in the PV system due to the mismatch is thereby taken into account. The realization of the mismatch by means of the MPP regulating element present in any event requires no further software and hardware investment with the exception of a modified control algorithm retrievable as needed.

An advantageous approach to start the mismatch provides that first the voltage point on the typical U/I characteristic of the inverter is adjusted that corresponds substantially to the actual open circuit voltage across the battery bank. Next, a disconnect switch, located in the current path of the connecting line of the battery bank to the inverter, is closed. Thereupon, the operating point of the MPP regulating element is set to a voltage value smaller than the current voltage of the battery bank. This approach assures a smooth transition to a battery supply and avoids a notable compensating current. The voltage, also called the PV generator, at the PV system is accordingly first set to the value of the prevailing open circuit voltage of the battery bank, and then the disconnect switch is closed. Because the three branches connected in parallel by the disconnect switch ((i) the PV generator, (ii) the battery bank, and (iii) the inverter) are now supplied with the same voltage, no compensating current flows. Next, the voltage value, by means of the MPP regulating element, is brought to the mismatched value relative to the photovoltaically generated maximum power per se. This can occur in small steps, whereby the current flowing in the battery path is measured and depending on the measurement result, the voltage is left or reduced further.

The end of the mismatch can occur, for example, according to the "trial and error" principle, in that meanwhile the feed power of the battery bank is again taken back or is totally adjusted, e.g., at intervals of 30 seconds, to obtain the information on the instantaneous power on the photovoltaic side. This is to be preferred, however, when the current generated by the photovoltaic system is measured by a first current measuring sensor and the mismatching is ended when the current measured by the first current measuring sensor exceeds a limit. The limit in this case can vary depending on the minimum power to be guaranteed and the mismatched voltage at the MPP regulating element.

So that a charged battery bank is always available ready for use, after the mismatching ends, the disconnect switch should continue to remain closed for the purpose of recharging the battery bank at least until a predefinable charge state of the battery bank is measured.

Depending on the agreements reached between the current producer and the current consumer, it may be necessary to have another power supplier available. If the current consumer has agreed to a timely warning with a lead time of a few minutes, this measure is not required. The current consumer can then take precautions by turning off, for example, machines not currently needed and restarting them again later. In the other case of the permanently present guaranteed minimum power, it is planned to provide a second current measuring sensor in the line between the battery bank and the inverter and with a shortfall in a predefined charge state of the battery bank, to initiate the connection of a replacement power plant to the supply network. A criterion different from the charge state could be, for example, the integral over the supplemental current supplied on the battery side.

In regard to the device, the aforementioned object is attained in that the battery bank is connected to the inverter via a disconnect switch, and that a control/regulating device is provided, which sets the operating point of the inverter to a predefinable voltage with turning off of the regulation at the maximum power time by the MPP regulating element and closes the disconnect switch during the shortfall in a predefined minimum power. It applies here as well that the battery bank connected parallel to the photovoltaic system is discharged by the smaller voltage value and the discharge current on the part of the battery is added to the current generated by the photovoltaic system.

To detect the additional measures described in relation to the method, the device has a first current measuring sensor in the current path of the battery bank to the inverter and preferably a second current measuring sensor or a diode in the current path between the inverter and the photovoltaic system. Similarly, the device is provided and set up to adjust, in conjunction with the MPP regulating element of the inverter, the DC voltage at the input terminals in such a way that a desired current flows out of or to the battery bank.

In the current path of the series connection of batteries, a current measuring sensor is provided, which is connected to a control unit, which in conjunction with the MPP regulating element of the inverter adjusts the DC voltage at the input terminals in such a way that a desired current flows out of or into the battery bank. The desired value of the discharge current is thereby the determining criterion, independent of the mismatch to the photovoltaic system which is operated with the impressed reduced voltage. Similarly, excess energy of the photovoltaic system can be charged in the battery bank by adjusting a suitable MPP value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
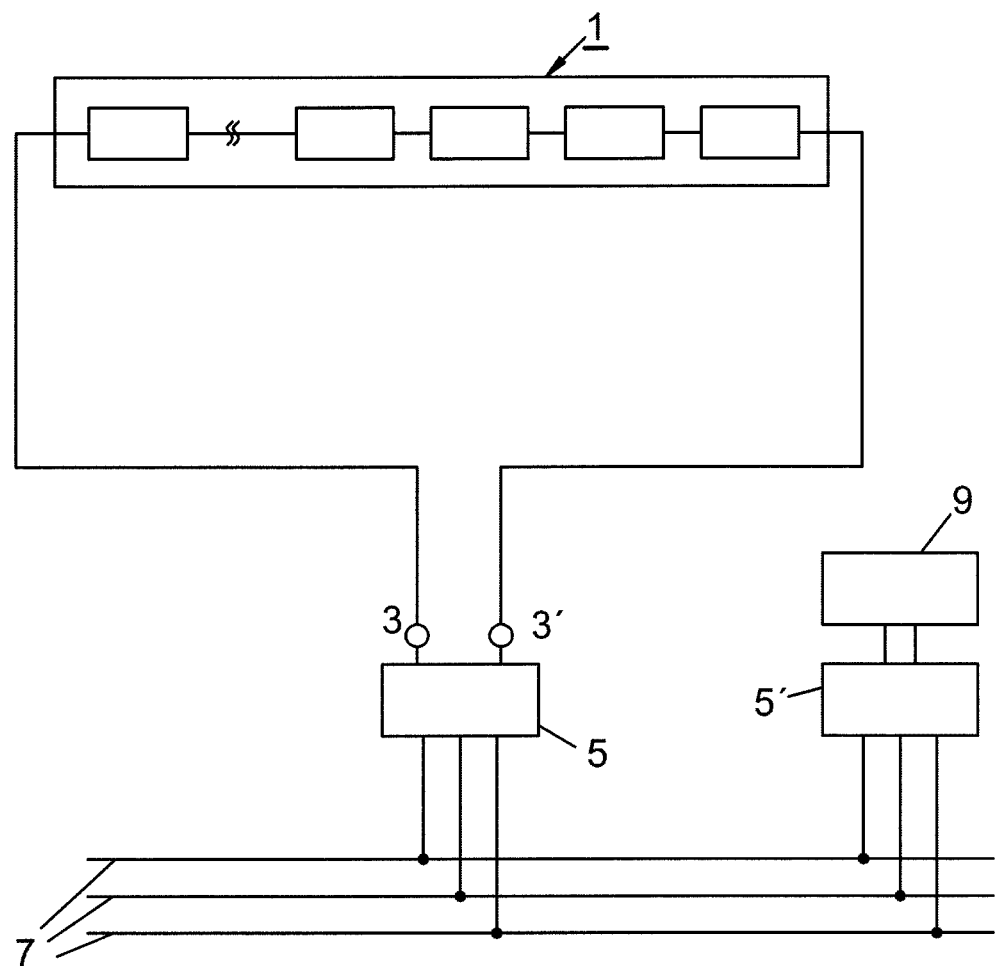
FIG. 1 illustrates an arrangement of an additional battery according to the conventional art.

Corresponding parts and dimensions are provided with the same reference characters in all figures.

It should be noted first that an inverter does in fact have a high efficiency in energy conversion, but because of its large capacitors is relatively slow to convey the power produced by the photovoltaic modules at the maximum power point (MPP).

Figure 2:
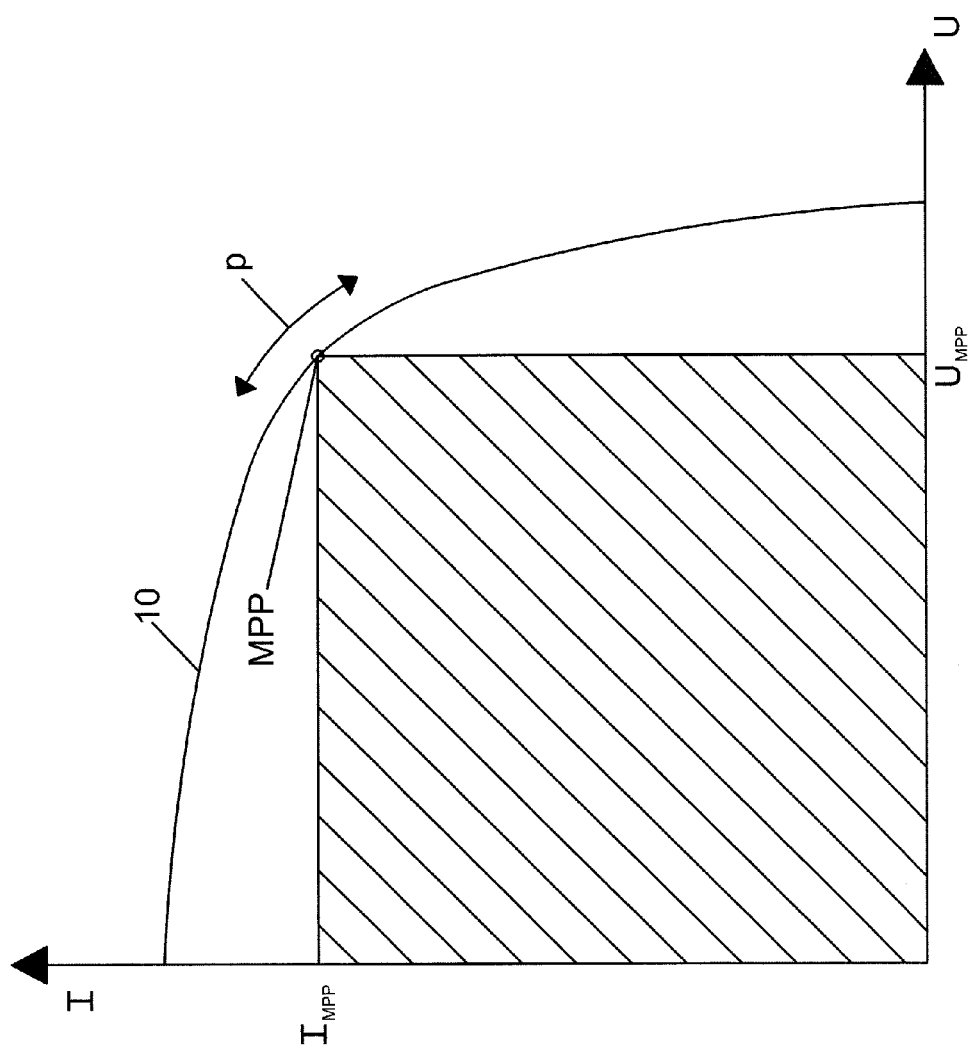
FIG. 2 illustrates a typical current/voltage relationship of a photovoltaic system.

A typical current/voltage curve 10 of a photovoltaic system is shown in the explanatory FIG. 2. This curve has a maximum power point MPP, at which the cross-hatched area has a maximum size corresponding to a maximum available power. The regulation of the inverter occurs by an iterative approximation to this power point MPP by regulating back and forth along the double arrow P until the MPP is reached. Depending on the solar radiation, temperature of the semiconductor elements, etc., this MPP changes continuously and the regulation must permanently determine and set a new MPP. In this case, the slow regulation response of the inverter is opposed by an efficient follow-up response to the actual MPP. Currently, between 20 seconds and 3 minutes must be estimated until an inverter is adjusted to a currently present solar energy radiation. Either due to the weather or also due to this inertia, a power output below the necessary minimum power may perhaps be generated, which is compensated by the measures of the invention.

Figure 3:
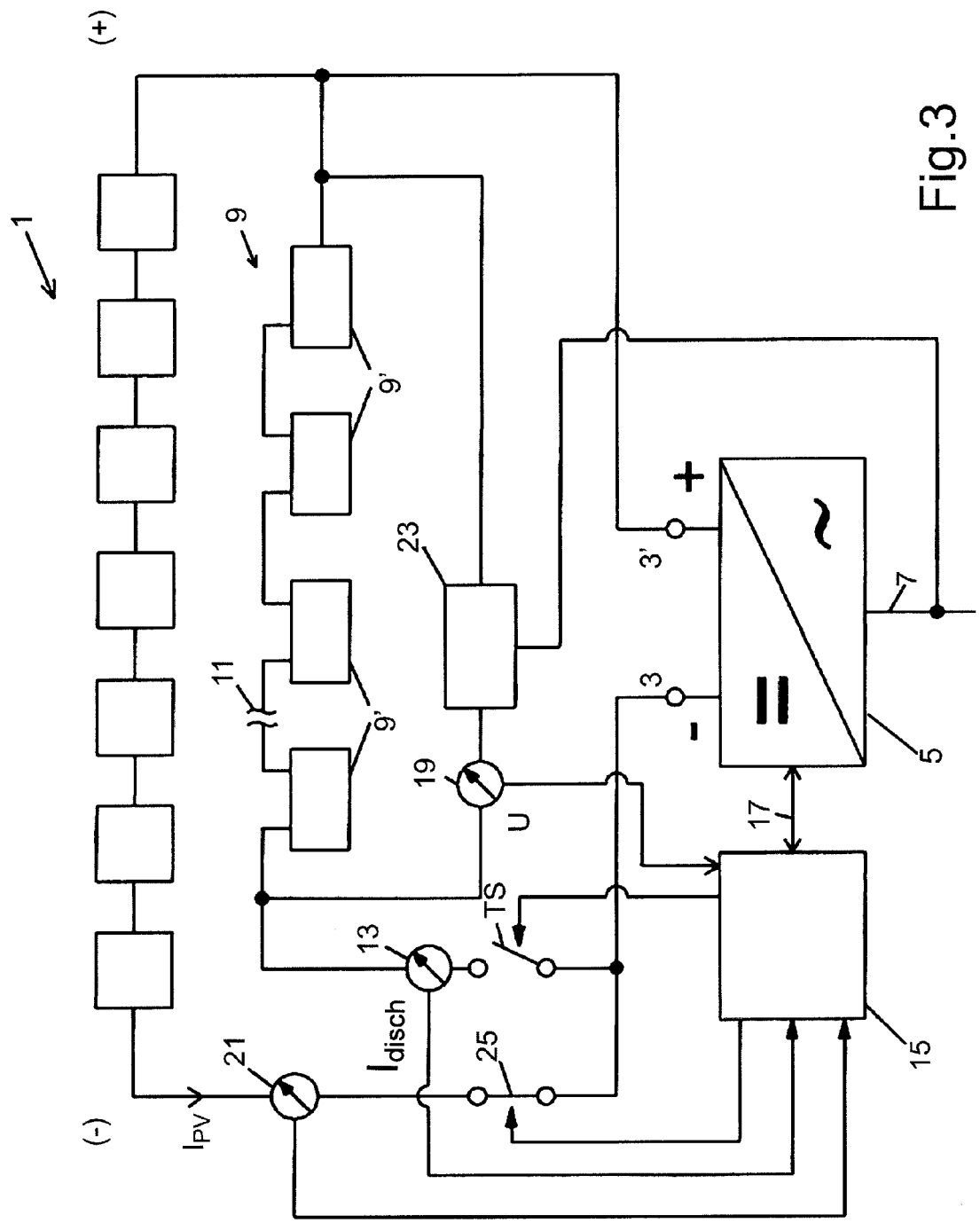
FIG. 3 illustrates an embodiment of the invention.

In the exemplary embodiment shown in FIG. 3, battery bank 9 includes 10 batteries 9', which in turn may have a plurality of parallel- and series-connected individual batteries. An interface 11 is shown behind the first battery 9' and the last three batteries 9', pointing electrically to the plus pole of the PV system and inverter 5, are shown again. A battery bank within the meaning of the present invention is thereby understood to be storage means of any form and size for electrical power.

At any place in the current branch of battery 9', preferably in the connecting line of battery bank 9 to inverter 5, a first current measuring sensor 13 is provided, which detects the current flowing from or to battery bank 9. Current measuring sensor 13 provides its measurement signal to a control and/or regulating device 15, which is also called a control unit hereafter and which exchanges data with inverter 5 via a signal line 17. In inverter 5, an MPP regulating element, well known in the relevant field, is provided whose function will be described in greater detail with use of FIG. 2. The MPP regulating element takes the operating point of PV system 1 along the curve shown in FIG. 2. In this case, interventions into the MPP regulation are possible in that, e.g., the voltage value is specified toward which the voltage between input terminals 3, 3' and thereby at the PV system is moved. This voltage should be close to the rated battery voltage of, e.g., 600 V, to keep compensating currents from and to battery bank 9 low during routine operation. This applies, however, only when battery 9 is integrated into the parallel circuit of PV system 1 and inverter input 3, 3'. Otherwise, normal operation of PV system 1 is possible without potentially limiting criteria.

The use of battery bank 9 is described below with the aid of FIGS. 3 and 4a to 4d. A state is assumed here according to FIG. 4a, in which the PV system is to be operated at time $t_0$ without shading and supplies a power P corresponding to 1.2 times the required minimum power $P_{min}$. At time $t_1$, an imminent shortfall in the guaranteed minimum power is determined via the PV system power meter (not shown), inherent to PV systems, because only a power P measuring 1.05 times the minimum power $P_{min}$ is produced photovoltaically. The imminent shortfall can occur, e.g., via a current measurement at the first current measuring sensor 13 in combination with a voltage measurement by means of voltmeter 19 tapping both ends of battery bank 9. An imminent shortfall can be defined, e.g., as a situation in which the power generated on the photovoltaic side is still only between 3% and 10% away from the minimum power. In the shown exemplary embodiment, this should be the case at a status according to FIG. 4b, in which at time $t_1$ the MPP has shifted to a value of a higher voltage $U_1$, as a result of which a lower current $I_1$ as well flows. Their product $U_1 \times I_1 = P_1$ corresponds in fact to the maximum possible area at the prevailing temperature and solar radiation. The product $U_1 \times I_1 = P_1$, however, is nevertheless only five percent (5%) away from the required minimum power $P_{min}$.

Figure 4A:
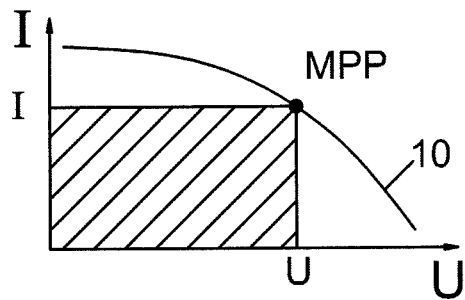
FIGS. 4a-4d illustrates operating states of the MPP regulation at different times of the process management.
Figure 4B:
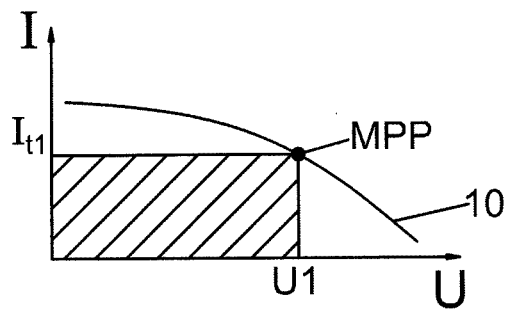
Figure 4C:
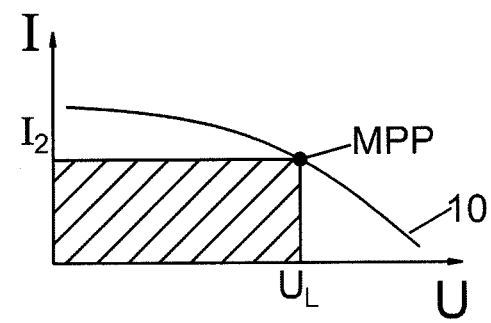

An imminent shortfall is therefore present, whereupon according to the invention at a time $t_2$ which is shown in FIG. 4c, the MPP regulation sets the voltage value U at the input terminals 3, 3' of inverter 5 to the value, measured by voltage meter 19, of the open circuit voltage $U_L$ of battery bank 9. This measure leads to an associated current value $I_2$ on the typical U/I characteristic 10, which represents a mismatch to the otherwise desirable MPP. The product $P_L = U_L \times I_2$ due to the mismatch signifies a further decline in the power P, in the example to a value of still only 1.01 times the minimum power $P_{min}$.

It is assured by the intermediate step illustrated in FIG. 4c that the voltage across PV generator 1 and the parallel-connected input terminals (inputs) 3, 3' has the same value as that of battery bank 9, whereupon a disconnect switch TS is closed by control/regulating device 15. The closing of disconnect switch TS has the effect that battery bank 9 as well is connected parallel to input terminals (inputs) 3, 3'. Based on the control loop voltage matched by the MPP regulating element to the open circuit voltage $U_1$, possibly only a low compensating current will flow. The value or the position of the voltage $U_1$ at the time of the needs analysis is negligible in this case. The position of the voltage $U_1$ can also have been to the left of the MPP, therefore at a relatively low voltage value. It is important that the voltage $U_1$ is brought from the current value to the value $U_L$. If the line system and the involved components (PV system, inverter, etc.) were to be designed for notable compensating currents, then the intermediate step according to FIG. 4c can be omitted. After the closing of the disconnect switch TS, the voltage across battery bank 9 is perhaps reduced somewhat, because the clear no-load case is eliminated.

Figure 4D:
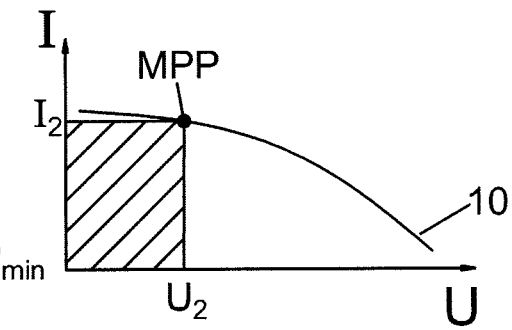

In the next step illustrated with the aid of FIG. 4d, the voltage at the MPP regulating element is set to a value that is smaller than the open circuit voltage $U_L$, prevailing after the connection, across battery bank 9. This should be the voltage $U_2$ in the exemplary embodiment. This causes a still greater distance from the MPP, which is accepted, however. The low voltage $U_2$ provokes a discharge current $I_{disch}$ from battery bank 9, which is added to current $I_2$ of photovoltaic system 1. Both currents $I_{disch}$ and $I_2$ are fed together into inverter 5 and passed on as alternating current to network 7. In this case, the sum of both currents $I_{disch}$ and $I_2$ assures that a total power $P_{total}$ above the minimum power can again be delivered to inverter 5.

In the current path to PV system 1, a second current measuring sensor 21 is provided, which detects the PV system current $I_{PV}$. An increase in solar radiation will lead directly to an increase in the PV system current $I_{PV}$, because an accompanying temperature increase at the semiconductor occurs only much later. If this increase is sufficiently large, the disconnect switch TS can be opened again and the control algorithm can again be used for the MPP, instead of the retention of the fixed, mismatched voltage value $U_2$. Depending on the discharge state of battery bank 9 and the value of the again available PV power, the disconnect switch TS can also remain closed initially to recharge battery bank 9 via PV system 1. The disconnect switch TS is then opened only at a later time, when a satisfactory charge state of battery bank 9 is again achieved. In addition or instead of the second current measuring sensor 21, a diode with a flow direction to inverter 5 can also be provided.

In the case of a high strain on battery bank 9 over the course of a day, it can occur that sufficient photovoltaically generated energy is no longer available toward the evening for charging. In order to find battery bank 9 fully charged on the next morning, a charging device 23 is provided, which is fed by network 7.

It is achieved by means of the described measure that in the case of a drop in PV system 1 below the minimum power, the deficit can be supplied from battery bank 9 especially also without interruption. Because battery bank 9 can compensate for the energy deficit only for a limited time period of a few minutes, it is expedient to prepare a replacement power plant for feeding into network 7, as soon as it emerges that the shortfall in the minimum power in photovoltaic system 1 is not merely transient in nature, as, e.g., due to a single passing cloud. In this respect, the connection of battery bank 9 should be combined with the start-up of a replacement power plant or the connection of an already running replacement power plant. The replacement power plant is suitable for supplying a direct current and in this case can be a conventional diesel generator with a rectifier, which is capable of providing supplementary power within about a minute. A gas turbine is also suitable whose preparation to support the supply takes only a few minutes. The period of time that elapses between the request by control/regulating device 15 to the actual connection of the unit to inverter 5 is therefore advantageously between a minute and five minutes, particularly between two and four minutes. Yet another disconnect switch 25 is shown in FIG. 3 with whose help photovoltaic system 1 can be disconnected from inverter 5. This makes it possible to use inverter 5 itself during reverse operation as a charging device.

A possible criterion can be that the product of the electrical power generated by the photovoltaic modules and a period of time (therefore the integral over the power) falls below a preselectable minimum value. Other criteria are conceivable, which take into account the nature of the observed drop in power of the photovoltaic system, such as, e.g., alternation of harsh shadows and light, fleecy clouds, heavy fog, etc. If the photovoltaically generated energy is not needed due to the network state, it can be used for charging battery bank 9, as a result of which the power delivered at the output of inverter 5 is reduced accordingly.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a photovoltaic system having an inverter at whose input terminals a DC output voltage of a photovoltaic generator is applied and whose output is connected to a supply network, and having a battery bank connected by a switch in parallel to the input terminals, the method comprising:
   adjusting a maximum power point of the photovoltaic generator via a regulating element of the inverter; and
   operating selectively the photovoltaic generator by setting a voltage value at the input terminals of the inverter, the voltage value and its associated current value are mismatched with respect to the maximum power point of the photovoltaic generator in order to provoke a discharge current from the battery bank to the input terminals of the inverter if a predefinable minimum power of the photovoltaic generator is not achieved,
   wherein the output of the inverter is continuously connected to the supply network such that an uninterrupted supply of alternating current is provided from the photovoltaic system to the supply network at or above the predefinable minimum power,
   wherein a voltage measuring sensor is provided in parallel to the battery bank to measure the battery voltage in case of the switch being either open or closed, and
   wherein the battery, the photovoltaic generator and a DC side of the inverter are simultaneously at a same operating voltage in both a charging state and discharging state.

2. The method according to claim 1, wherein the nominal voltage of the battery bank corresponds to the operating voltage of the photovoltaic generator.

3. The method according to claim 1, wherein the mismatching is started:
   by first adjusting the voltage point on the typical U/I characteristic of the inverter that corresponds substantially to the actual voltage across the battery bank,
   by then closing a disconnect switch arranged in the current path of the connecting line of the battery bank to the inverter, and
   by setting the operating point of the regulating element of the inverter to a voltage value smaller than the actual voltage of the battery bank.

4. The method according to claim 1, wherein the current generated by the photovoltaic system is measured by a first current measuring sensor and the mismatching is ended when the current measured by the first current measuring sensor exceeds a limit which is predefined depending on the minimum power.

5. The method according to claim 4, wherein after the mismatching ends, the disconnect switch remains closed for recharging the battery bank until a predefinable charge state of the battery bank is determined.

6. A method for operating a photovoltaic system having an inverter at whose input terminals a DC output voltage of a photovoltaic generator is applied and whose output is connectable to a supply network, and having a battery bank connected switch in parallel to the input terminals, the method comprising:
   adjusting a maximum power point of the photovoltaic generator via a regulating element of the inverter and
   operating selectively the photovoltaic generator by setting a voltage value at the input terminals of the inverter, the voltage value and its associated current value are mismatched with respect to the maximum power point of the photovoltaic generator in order to provoke a discharge current from the battery bank to the input terminals of the inverter if a predefinable minimum power of the photovoltaic generator is not achieved,
   wherein the output of the inverter is continuously connected to the supply network such that an uninterrupted supply of alternating current is provided from the photovoltaic system to the supply network at or above the predefinable minimum power,
   wherein a voltage measuring sensor is provided in parallel to the battery bank to measure the battery voltage in case of the switch being either open or closed, and
   wherein a second current measuring sensor is provided in a line between the battery bank and the inverter, and wherein, with a shortfall in a predefined charge state of the battery bank, the connection of a replacement power plant to the supply network is initiated.

7. A device for operating a photovoltaic generator, the device comprising:
   an inverter, at whose input terminals a DC output voltage of the photovoltaic generator is applied and whose output is connectable to a supply network;
   a battery bank connectable by a switch in parallel to the input terminals;
   a regulating element of the inverter configured to adjust a maximum power point of the photovoltaic generator;
   a disconnect switch through which the battery bank is connected to the inverter; and
   a control/regulating device that sets the operating point of the photovoltaic generator by the regulating element of the inverter to a predefinable voltage value and that closes the disconnect switch during a shortfall of a predefined minimum power of the photovoltaic system,
   wherein the output of the inverter is continuously connected to the supply network such that an uninterrupted supply of alternating current is provided from the photovoltaic system to the supply network,
   wherein the predefinable voltage value and its associated current value are mismatched with respect to the maximum power point of the photovoltaic generator,
   wherein a voltage measuring sensor is provided in parallel to the battery bank to measure the battery voltage in case of the switch being either open or closed, and
   wherein the battery, the photovoltaic generator and a DC side of the inverter are simultaneously at a same operating voltage in both a charging, state and discharging state.

8. The device according to claim 7, wherein a first current measuring sensor is arranged in a current path of the battery bank to the inverter.

9. The device according to claim 7, wherein a second current measuring sensor or a diode is arranged in a current path between the inverter and the photovoltaic generator.

10. The device according to claim 7, wherein the control/regulating device in conjunction with the regulating element of the inverter adjusts the DC voltage at the input terminals such that a predefined current flows out of or to the battery bank.

11. The method according to claim 1, wherein the uninterrupted supply of alternating current is provided from the photovoltaic system by the photovoltaic generator, the battery bank, and/or a generator.

12. The method according to claim 1, wherein the uninterrupted supply of alternating current is provided in a first operating state by the photovoltaic generator and is provided in a second operating state by both the photovoltaic generator and the battery bank.

13. The device according to claim 7, wherein the uninterrupted supply of alternating current is provided from the photovoltaic system by the photovoltaic generator, the battery bank, and/or a generator.

14. The device according to claim 7, wherein the uninterrupted supply of alternating current is provided in a first operating state by the photovoltaic generator and is provided in a second operating state by both the photovoltaic generator and the battery bank.

15. The device according to claim 7, wherein the voltage established by the control/regulating device is lower than a voltage at the maximum power point.

16. The device according to claim 7, wherein the operating point of the photovoltaic generator is set to a voltage smaller than a voltage of the battery bank.

* * * * *